United States Patent [19]

Ruso et al.

[11] Patent Number: 4,987,189

[45] Date of Patent: Jan. 22, 1991

[54] POLYCAPROLACTAM-BASED POLYMER COMPOSITIONS

[75] Inventors: Saverio Ruso, Genova; Giovanni C. Alfonso, Serravalle Scrivia; Enrico Pedemonte; Antonio Turturro, both of Genova; Ezio Martuscelli, Naples, all of Italy

[73] Assignee: Consiglio Nazionale Delle Ricerche, Rome, Italy

[21] Appl. No.: 783,333

[22] Filed: Oct. 3, 1985

Related U.S. Application Data

[63] Continuation of Ser. No. 611,119, May 17, 1984, abandoned.

[30] Foreign Application Priority Data

Jul. 6, 1983 [IT] Italy .................... 21950 A/83

[51] Int. Cl.$^5$ ............................................. C08L 77/02
[52] U.S. Cl. ................................. 525/183; 525/184
[58] Field of Search ............................ 525/183, 184

[56] References Cited

U.S. PATENT DOCUMENTS

| 4,414,362 | 11/1983 | Lenke et al. | 525/184 |
| 4,448,956 | 5/1984 | Lenke et al. | 525/183 |

FOREIGN PATENT DOCUMENTS

| 3021252 | 2/1978 | Japan | 525/183 |
| 3101048 | 9/1978 | Japan | 525/184 |

Primary Examiner—Ana L. Carrillo
Attorney, Agent, or Firm—Stevens, Davis, Miller & Mosher

[57] ABSTRACT

New polycaprolactam-based polymer compositions have been prepared by polymerising caprolactam in the presence of a quantity of nitrile rubber not exceeding 25% by weight of the total mixture weight, and preferably 5-20% by weight.

The polymerisation is conducted in the presence of anionic initiators and anionic polymerisation activators.

The new compositions obtained are extremely uniform, and have physical and elasticity characteristics which substantially coincide with nylon-6. There resistance to impact and deformation is however substantially higher.

8 Claims, No Drawings

POLYCAPROLACTAM-BASED POLYMER COMPOSITIONS

This application is a continuation of application Ser. No. 611,119, filed May 17, 1984, now abandoned.

This invention relates to new polycaprolactam-based polymer compositions with better resistance to impact and deformation than nylon-6.

More precisely, the present invention relates to polycaprolactambased polymer compositions containing nitrile rubber, and the new process for their preparation.

Polycaprolactam or nylon-6 is a polyamide known to possess excellent mechanical and physical properties which make it suitable not only for fiber production, but also for the production of technical articles both by injection molding of the preformed polymer and by reaction injection molding of the caprolactam to be polymerized.

However, polycaprolactam is unsuitable for the production of large articles or pieces which require a certain flexibility and impact strength, because of its fragility and anelastic deformability.

The problem of obtaining a material which while preserving the excellent mechanical and physical characteristics of polycaprolactam has decidedly better impact strength has been confronted in various ways, but none of these has yet given satisfactory results.

For example, polymers of higher lactams have been prepared, such as polylauryllactam. Although these polymers have better flexibility than polycaprolactam, their overall characteristics are such as to extremely limit their use.

Caprolactam block copolymers have also been prepared, for example copolymers with polyethers or polyesters (U.S.A. Pat. Nos. 3,993,709, 3,944,629, 3,682,262). Although these polymers have greater elasticity, they still have unsatisfactory impact strength, and also have poor thermal stability which strongly limits their use.

Finally, again in order to obtain a polycaprolactam with improved impact strength, various mixtures of polycaprolactam with polymers of various types, preferably of an elastomer nature, have been prepared (West German patents No. 2,654,346, 2,742,176, 2,758,615, U.S.A. Pat. No. 4,197,379).

However, no real result has been obtained with these mixtures of preformed polymers, in that for processing purposes they require a temperature of around 260°-280° C., to which however none of the modifying rubbers withstands. In other words, in practice either the mixture is made at a relatively low temperature in order not to alter the modifying polymer, in which case mixing is very imperfect and the characteristics of the article are irregular, or mixing is carried out at a temperature which gives perfect mixing, in which case the polymers incorporated in the polycaprolactam decompose, thus worsening the characteristics rather than improving them.

We have now discovered the subject matter of the present invention, namely a new process for preparing polycaprolactam-based polymer compositions, which enables compositions to be obtained having totally new characteristics and in particular possessing entirely satisfactory flexibility and resistance to impact and deformation, while maintaining the other physical and mechanical characteristics inherent in polycaprolactam practically unaltered.

The new process consists essentially of effecting anionic polymerization of caprolactam in the presence of a rubber phase, constituted by nitrile rubber.

More precisely, according to the present invention, caprolactam containing dissolved or uniformly dispersed nitrile rubber is polymerized by adding an anionic initiator. In this respect, nitrile rubber which is not cross-linked is soluble in caprolactam, whereas if cross-linked it is swellable and uniformly dispersible therein.

The nitrile rubber must be dissolved or dispersed in the caprolactam in a quantity not exceeding 25% by weight of the total weight of the mixture, in that higher percentages lead to a polymerization rate which is industrially unacceptable.

The preferred quantity lies between 5 and 20% by weight. Within this range, by varying the percentage of the rubber phase, it is possible to obtain a range of caprolactam polymers which all possess the excellent physical and mechanical characteristics of pure polycaprolactam, but which have much better impact strength, dimensional stability and tear strength, also at very low temperature.

The polymer compositions obtained in this manner are thus to be considered as new products, characterized by new properties which are absolutely uniform at all points of the mass.

In practice, the new process is implemented by dissolving between 5 and 20% by w. nitrile rubber in the caprolactam at a temperature of 120°-150° C., according to the molecular weight of the rubber or its degree of cross-linkage.

The solution or uniform dispersion obtained in this manner is cooled to below 100° C., and an anionic initiator is added preferably chosen from the group consisting of alkaline or alkaline earth metals, metal hydrides, alkaline borohydrides, organometal compounds, Grignard compounds, alkaline hydrates and alkaline alcoholates, in a quantity of between 0.1 and 2 mol % with respect to the caprolactam monomer. The mixture is then raised to the polymerization temperature of between 120° and 180° C., and a polymerization activator chosen from the group consisting of N-acylcaprolactams and N-acylcaprolactam precursors is added in a quantity of between 0.1 and 2 mol % with respect to the caprolactam. The polymerization is always completed at a temperature of between 120° and 180° C.

By suitably varying the quantity of initiator and activator within the defined range, and varying their relative ratios, the temperature and the polymerization time, it is possible to vary the mean molecular weight, the molecular weight distribution and the maximum polycaprolactam conversion.

The operational method by which the new process is implemented can obviously be varied in many ways apparent to the expert of the art, but without obtaining different results and leaving the scope of the present invention.

For example, instead of effecting the stages in the aforesaid succession, it is possible to dissolve or swell the nitrile rubber in only a fraction of the caprolactam at a temperature of 120°-150° C., and dissolve the initiator in the remaining caprolactam at a temperature of between 85° and 120° C., so as to effect the reaction for forming caprolactamate. When the reaction has finished, i.e. when hydrogen is no longer evolved, this fraction is added to the other containing the nitrile rubber in solution, and the mixture is heated to the polymerization temperature of 120°-180° C.

The polymerization activator is added at this point.

According to a further alternative, instead of being carried out in a reactor, the polymerization is carried out directly in the mould for the pieces or machine parts to be produced by molding, so effecting the reaction injection molding process.

When effected with the new polymer compositions, this molding process has the same advantages as the use of caprolactam over other materials.

These include a slow increase in viscosity during polymerization, which enables production to be perfectly controlled. Furthermore, the new compositions do not require the use of agents for removing them from the mold, nor further finishing operations on the removed casting.

It is important to note that the possibility of polymerizing caprolactam in the presence of a rubber phase of a different nature was theoretically unpredictable, in that anionic polymerization is well known to be very sensitive and easily inhibited by the presence of foreign materials.

Likewise completely unpredictable was the possibility of giving nylon-6 those impact strength and elasticity characteristics which it was not possible to obtain with mixtures of preformed polymers of known type.

In order to make the process according to the present invention more easily reproducible, some practical examples are given hereinafter, but these are purely illustrative and in no way limitative of the invention.

EXAMPLE 1

5 parts by weight of nitrile rubber containing 33% of acrylonitrile (Elaprim S 357 EP of Montedison) were dissolved in 95 parts by weight of caprolactam.

Dissolving was effected at a temperature of between 120° and 130° C. for 30 minutes.

The solution was then cooled to about 85° C., and lithium hydride in a quantity of 0.015 parts per 100 parts of caprolactam was then added as initiator.

The mixture was then heated to about 155° C., and the activator (N-acetylcaprolactam) was then added at this temperature to the extent of 0.90 parts per 100 parts of caprolactam. Polymerization was effected for about 10 minutes.

The high polymer yield was 95%.

EXAMPLE 2

5 parts by weight of nitrile rubber of the Elaprim S 357 EP type were dissolved in 72 parts of caprolactam in a polymerization reactor, in the manner described in the preceding example.

23 parts of caprolactam were fed into another reactor and heated to 120° C. This temperature was maintained for about 10–15 minutes, after which the mass was cooled and 0.015 parts by weight of lithium hydride per 100 parts of total caprolactam were then added. The caprolactam was again heated to 120° C. in order to cause it to react with the lithium hydride, and this temperature was maintained until no further hydrogen was evolved.

The lithium caprolactamate obtained in this manner was fed into the polymerization reactor together with the solution of nitrile rubber in caprolactam, the mixture then being heated to the polymerization temperature of 155° C. The activator in the form of N-acetylcaprolactam was then added in the same quantity as Example 1, and the polymerization was allowed to proceed for about 10 minutes. A conversion of 96% was obtained.

EXAMPLE 3

10 parts of Elaprim S 357 EP nitrile rubber were dissolved at a temperature of 120°–130° C. in 75 parts of caprolactam in a polymerization reactor fitted with an agitation system.

The dissolving time was about 25 minutes.

The residual caprolactam (15 parts) was heated to 120° C. and kept at this temperature for 15 minutes, after which lithium hydride was added to the extent of 0.015 parts per 100 parts of total caprolactam.

This temperature was maintained until hydrogen ceased to be evolved.

In the meantime, the polymerization reactor was heated to 155° C., and the activator (N-acetylcaprolactam) was added to the extent of 0.90 parts per 100 of caprolactam.

The lithium caprolactamate was added to the reactor, and polymerization thus commenced under continuous agitation, and proceeded for the time during which the viscosity remained such as to allow agitation.

The polymerization occurred in a time of 15 minutes with a yield of 92%.

EXAMPLE 4

Using 15 parts of nitrile rubber dissolved in 70 parts of caprolactam by agitation for 25 minutes at 130° C., and using the residual 15 parts of caprolactam for forming the lithium caprolactamate, polymerization was effected at 155° C. for a time of 20 minutes, to obtain a caprolactam conversion yield of 90%.

EXAMPLE 5

Caprolactam polymerization was repeated as in Example 1, but using 5 parts by weight of the nitrile rubber Elaprim S 354 EP containing 38% of acrylonitrile.

The polymerization was conducted at 120° C. for 15 minutes, to obtain a conversion of 90%.

EXAMPLE 6

5 parts by weight of Elaprim S 354 EP rubber were dissolved at 120°–130° C. in 72 parts of caprolactam in a polymerization reactor provided with an agitation system, agitating for 20 minutes.

The caprolactam preparation and polymerization were effected in the manner described in Example 3. After a time of about 10 minutes, a polymerization product was obtained with an average yield of 95%.

EXAMPLE 7

Caprolactam polymerization was repeated as in Example 1, but using the Elaprim S 354 EP nitrile rubber to the extent of 10 parts by weight per 100 parts of total mixture. The time for dissolving the rubber in the caprolactam at 120° C. was 40 minutes.

Polymerization was conducted at 155° C. for 15 minutes, to obtain a caprolactam conversion yield of 92%.

EXAMPLE 8

A polymerization test was carried out in the manner of Example 3, but using the nitrile rubber Elaprim S 354 EP containing 38% of acrylonitrile. The dissolving time was 25 minutes.

The reaction temperature was again fixed at 155° C., and polymerization was effected for 15 minutes to obtain a yield of about 90%.

EXAMPLE 9

Caprolactam was polymerized by adding to it 13% by weight of the same type of nitrile rubber, ie Elaprim S 354 EP.

Polymerization was conducted in the manner of Example 1, with a dissolving time of 40 minutes.

A caprolactam polymerization yield of 90% was obtained after 18 minutes.

EXAMPLE 10

Using the same conditions as Example 1, but adding the rubber Elaprim S 354 EP to the extent of 14% by weight of the total mixture, and polymerizing at 155° C. for 17 minutes, a polymer was obtained with a caprolactam conversion yield of 89%.

The rubber dissolving time was about 50 minutes.

EXAMPLE 11

Operating as in Example 10, but with 16% by weight of nitrile rubber (dissolved in the caprolactam in 50 minutes), a caprolactam polymer conversion yield of 90% was obtained after a polymerization time of 20 minutes.

EXAMPLE 12

Operating as in Example 4, but using the nitrile rubber Elaprim S 354 EP containing 38% of acrylonitrile, an absolutely uniform polymer product was obtained after a polymerization time of 20 minutes, with a caprolactam polymerization yield of 89%.

EXAMPLE 13

A caprolactam polymerization test was conducted with 20 parts of nitrile rubber Elaprim S 354 EP, in the manner described in Example 1, with a dissolving time of 60 minutes. A polymer conversion yield of about 83% was obtained after a polymerization time of about 30 minutes.

EXAMPLE 14

Caprolactam polymerization was effected with 20 parts by weight of the rubber Elaprim S 354 EP dissolved in 70 parts of caprolactam over 90 minutes at 120° C. The caprolactamate was prepared on the remaining 10 parts of caprolactam as indicated in Example 2.

Polymerization was effected at 180° C. for 20 minutes, to obtain a polymer conversion of 86%.

EXAMPLE 15

Operating as in Example 3, but with 20 parts of the rubber Elaprim S 354 EP dissolved in 70 parts of caprolactam over 30 minutes at 120° C., an absolutely uniform polymer was obtained after a polymerization time of 30 minutes, with a yield of 85%.

EXAMPLE 16

Caprolactam was polymerized in the presence of 5 parts of cross-linked nitrile rubber containing 36% of acrylonitrile (Elaprim S 361). The procedure of Example 1 was followed to obtain a polymer yield of 94% after 6 minutes.

EXAMPLE 17

Using the procedure of Example 2, caprolactam containing 5 parts of cross-linked rubber (Elaprim S 361) was polymerized. A polymerization yield of 95% was obtained after 5 minutes.

EXAMPLE 18

5 parts of Elaprim rubber S 361 were added to the caprolactam in the manner of Example 3.

A polymer conversion of 96% was obtained after 8 minutes.

EXAMPLE 19 (comparison example)

Anionic polymerization of caprolactam was effected using lithium hydride as initiator. The initiator was added to the caprolactam to the extent of 0.015% by weight at a temperature of about 85° C., and the mixture was heated to 110° C. to form lithium caprolactamate.

On termination of the reaction (when hydrogen evolution ceased) the mass was heated to about 155° C., and the activator, N-acetylcaprolactam, was added to the extent of 0.90% by weight of the caprolactam.

Polymerization was effected for about 5 minutes to obtain polycaprolactam with a conversion of 97%.

All the operations of the aforesaid examples were conducted in a dry nitrogen atmosphere.

The calculation of the conversion yield of the caprolactam into nylon by the polymerization reaction was made after eliminating the unreacted caprolactam and the higher oligomers from the product by washing with cold methanol.

The basic physical properties of the polymer compositions obtained in the various examples were determined, and determinations were also made of their more important mechanical properties by force-deformation and impact tests.

The results obtained are given in the following Tables.

TABLE 1

| Melting point, crystallisation and glass transition temperatures | | | | |
|---|---|---|---|---|
| Polymer of Example No. | Tm (°C.) | Tc (°C.) | Tg1 (°C.) | Tg2 (°C.) |
| 1 | 219 | 187 | −24 | 50 |
| 2 | 219 | 187 | −22 | 51 |
| 3 | 218 | 187 | −23 | 48 |
| 4 | 219 | 185 | −23 | 49 |
| 5 | 219 | 187 | −8 | 51 |
| 6 | 217 | 186 | −9 | 50 |
| 7 | 218 | 184 | −10 | 50 |
| 8 | 219 | 178 | −10 | 49 |
| 9 | 219 | 180 | −9 | 49 |
| 10 | 218 | 180 | −9 | 48 |
| 11 | 217 | 178 | −8 | 48 |
| 12 | 220 | 175 | −9 | 50 |
| 13 | 219 | 175 | −10 | 48 |
| 14 | 220 | 175 | −9 | 49 |
| 15 | 219 | 176 | −10 | 48 |
| 16 | 217 | 187 | — | 51 |
| 17 | 218 | 186 | — | 50 |
| 18 | 217 | 187 | — | 50 |
| 19 | 220 | 187 | — | 52 |

An examination of Table 1 clearly shows that all the new prepared polymer compositions have a biphase character, of which one phase shows physical characteristics substantially coinciding with those of polycaprolactam, and the other phase shows characteristics coinciding with those of nitrile rubber.

This means that the new compositions are extremely homogeneous and behave as a pure polycaprolactam with rubber addition, in a manner strictly different from the block copolymers and mixtures of the known art, which do not allow adequate mixing without substantial thermal and thermo-oxidative degradation of the rubber.

TABLE 2

| Product of Example No. | mechanical properties | | | |
|---|---|---|---|---|
| | Modulus of elasticity (G Pa) | Ultimate tensile stress (M Pa) | Yield strength (M Pa) | Elongation at yield point % |
| 19 | 1.7 | 61 | 60 | 7 |
| 1/5 | 0.7 | 24 | — | — |
| 2/6 | 1.2 | 41 | — | — |
| 3/8 | 1.1 | 35 | — | — |
| 7 | 0.9 | 20 | — | — |
| 4/12 | 1.0 | 32 | — | — |
| 9/10/11 | 0.8 | 16 | — | — |
| 13 | 0.6 | 10 | — | — |
| 14 | 1.0 | 25 | — | — |
| 15 | 1.2 | 27 | — | — |
| 16/17/18 | 1.1 | 40 | — | — |

The data refer to washed test pieces, is freed of the caprolactam and of the low molecular weight products, the test pieces having been molded at a temperature of 210°–220° C., annealed at 110° C. in vacuum for one hour, and conditioned in a drier over $P_2O_5$ for at least one day.

The tests were carried out with an Istron 1122 dynamometer. The mean values of ten test pieces are given for each example.

An analysis of the data given in Table 2 shows that the new compositions have elasticity characteristics which are substantially equivalent or slightly inferior to those of polycaprolactam.

The new compositions therefore behave as a new polymer with uniform mechanical properties, which are comparable overall with those of polycaprolactam.

TABLE 3

| Polymer of Example No. | Impact strength |
|---|---|
| | Impact strength Joules/m - Determined by the Izod notch test, on cut test pieces of cross-section 0.76 cm² (0.6 × 1.27 cm), with a 2.5 mm notch at an angle of 45° |
| 19 | 92 |
| 1/5 | 140 |
| 2/6 | 145 |
| 3/8 | 148 |
| 7 | 143 |
| 4/12 | 147 |
| 9/10/11 | 142 |
| 13 | 145 |
| 14/15 | 150 |

TABLE 3-continued

| Polymer of Example No. | Impact strength |
|---|---|
| | Impact strength Joules/m - Determined by the Izod notch test, on cut test pieces of cross-section 0.76 cm² (0.6 × 1.27 cm), with a 2.5 mm notch at an angle of 45° |
| 16/17/18 | 148 |

The data of Table 3 clearly show that the new compositions have an impact strength which in all cases exceeds that of pure polycaprolactam by at least 60%, and they therefore solve the problem which has existed for a considerable time in the case of nylon-6 for molding purposes, in that they possess impact-resistant characteristics.

We claim:

1. A process for preparing a biphasic polymer composition consisting essentially of a polycaprolactam phase containing a uniformly dispersed nitrile rubber phase which comprises dissolving or dispersing from 1 to 25 weight percent, based on composition weight, of nitrile rubber in liquid caprolactam at a temperature between 120° C. and 150° C., and polymerizing the caprolactam at a temperature between 120° and 180° C. in the presence of an anionic polymerization initiator.

2. A process as claimed in claim 1, wherein the caprolactam monomer polymerization is initiated by means of between 0.1 and 1 mol % with respect to the caprolactam monomer of an anionic initiator selected from the group consisting of alkaline and alkaline earth metals, metal hydrides, alkaline borohydrides, organometal compounds, Grignard compounds, alkaline hydrates and alkaline alcoholates.

3. A process as claimed in claim 1, wherein the caprolactam polymerization is activated by a quantity of between 0.1 and 2 mol % with respect to the caprolactam of a polymerization activator selected from the group consisting of N-acylcaprolactams and their precursors.

4. A process as claimed in claim 2, wherein the anionic polymerization initiator is dissolved in the caprolactam at a temperature of less than 100° C.

5. A process as claimed in claim 2, wherein the anionic polymerization initiator is dissolved in the caprolactam at a temperature of 80° to 90° C.

6. A process as claimed in claim 3, wherein the polymerization activator is dissolved in the caprolactam at a temperature of between 120° and 180° C.

7. A polymer composition made by the process of claim 1.

8. An article made by reaction molding of caprolactam in which a nitrile rubber has been previously dissolved or uniformly dispersed at 120°–150° C. in an amount corresponding to 1–25% by weight of the total.

* * * * *